United States Patent [19]
Raimo et al.

[11] Patent Number: 5,303,305
[45] Date of Patent: Apr. 12, 1994

[54] SOLAR POWERED HEARING AID

[76] Inventors: Robert W. Raimo, 748 Erie Blvd. West, Rome, N.Y. 13440; Douglas R. Howard, 756 Rutger St., Utica, N.Y. 13501

[21] Appl. No.: 853,627

[22] Filed: Apr. 18, 1986

[51] Int. Cl.$^5$ .............................................. H02J 7/00
[52] U.S. Cl. ........................................ 381/68; 381/68.6; 368/205
[58] Field of Search .................. 381/68, 69.1, 69.2, 381/69.6; 368/205; 320/2

[56] References Cited

U.S. PATENT DOCUMENTS

| | | | |
|---|---|---|---|
| 2,901,551 | 8/1959 | Passow | 381/69.1 |
| 2,950,357 | 8/1960 | Mitchell et al. | 381/68.6 |
| 3,844,840 | 10/1974 | Bender | 138/89 |
| 3,921,049 | 11/1975 | Mellors | 368/205 |
| 4,087,960 | 5/1978 | Koichi | 368/205 |
| 4,293,808 | 10/1981 | Varadi | 320/2 |
| 4,379,988 | 4/1983 | Mahatall | 387/69.2 |

FOREIGN PATENT DOCUMENTS

| | | | |
|---|---|---|---|
| 3501448 | 8/1985 | Fed. Rep. of Germany | 381/68 |
| 2271608 | 12/1975 | France | 368/205 |
| 52-24012 | 2/1977 | Japan | 381/68 |

OTHER PUBLICATIONS

Published Abstract of Swedish application SE81060-11-A to Lindstrom, "Closed Cells for Hearing Air Current Supply" May 5, 1983.

Primary Examiner—Gene Z. Rubinson
Assistant Examiner—L.C. Schroeder
Attorney, Agent, or Firm—Bruns and Wall

[57] ABSTRACT

A hearing aid employs a permanent built-in rechargeable storage cell or battery, and a solar cell or other photo cell which powers the electronics of the hearing aid and recharges the storage cell. Favorably, a thin film amorphous silicon cell is employed, and is affixed onto an outward-facing surface of the aid. The photocell is connected in parallel with the storage cell and is of sufficient power capacity to power the amplifier and recharge the storage cell under average ambient light conditions. The storage cell is favorably of sufficient capacity to power the amplifier for at least several hours under darkness conditions.

10 Claims, 1 Drawing Sheet

SOLAR POWERED HEARING AID

BACKGROUND OF THE INVENTION

This device relates to apparatus for the hearing impaired, and is more particularly directed to hearing aids. The intention is specifically directed to hearing aids of the type containing a rechargeable battery or power source, and containing means for recharging the battery or power source.

A number of rechargeable hearing aids have been recently introduced, and these have found favor particularly among those for whom, because of arthritis or other conditions, battery replacement is a problem.

As is well known in the field, conventional hearing aid batteries require periodic replacement, with a battery typically lasting no more than two weeks to a month. However, those hearing-impaired persons needing an aid are often afflicted with arthritis and may have trouble manipulating the battery into the case. Also, many hearing aid wearers often forget to purchase batteries, or find it inconvenient to go out to obtain them. Batteries also represent an ongoing expense, and many hearing-impaired persons are required to live on a rather stringent budget.

The incorporation of a rechargeable cell or battery into a hearing aid has alleviated this problem somewhat, and two types of rechargeable hearing aids have been introduced, the direct plug-in type and the inductively rechargeable type. The direct plug-in type requires the wearer to plug a charger directly into a socket on the hearing aid, to apply recharging current directly to the battery. The inductively rechargeable type of hearing aid is simply dropped into a recharger, which produces an AC magnetic field. This oscillating field is then converted, by the hearing aid, to a direct current which recharges the hearing aid battery.

While these types of aids have been an improvement, it often happens that the wearer is away from home and may forget his or her recharger. Further, the wearer is limited as to where he or she can travel, as the recharger must be plugged into a standard power source, which may not be available if the wearer travels abroad, or for example, goes on an extended camping or fishing trip.

OBJECTS AND SUMMARY OF THE INVENTION

Accordingly, it is an object of this invention to provide a rechargeable hearing aid which avoids the drawbacks of prior art rechargeable aids.

It is another object of this invention to provide a hearing aid which does not require the use of a special charger device.

It is still another object of this invention to provide a hearing aid which derives its operating power directly from ambient light.

In keeping with the above objects, the hearing aid of this invention has a case or shell, a pick-up transducer or microphone for converting ambient sound to an electrical signal, an amplifier within the case or shell for amplifying the output of the pick-up transducer, an acoustical output transducer or receiver that is coupled to the amplifier output for delivering amplified sound into the auditory canal of a wearer, and a power cell within the case or shell for providing the electrical power to the amplifier. According to this invention, the power cell includes a rechargeable storage cell permanently situated within the case or shell, and a photocell, such as a thin-film amorphous silicon solar cell, that has its photosensitive surface exposed to the outside of the shell. The photocell is connected in parallel with the storage cell and is of sufficient power capacity to power the amplifier and to recharge the storage cell under average ambient light conditions. The storage cell is of sufficient capacity to power the amplifier for the wearer under night or darkness conditions for at least several hours.

In a favorable embodiment, the storage cell is a nickel-cadmium cell with a nominal capacity of between 10 and 30 milliampere hours, and the photocell or solar cell has a full-sun current capacity on the order of two milliamperes. A protective diode can be disposed between the storage cell and the solar cell, but, in the case of the preferred solar cell, the dark resistance is high enough that this protective diode can simply be omitted.

The solar rechargeable hearing aid of this invention can be an in-the-ear hearing aid, a canal hearing aid, a behind-the-ear hearing aid, an aid built into the temple piece of an eyeglass frame, or a body aid. In the latter case, the body aid can have its case or shell formed as a broach, pendant, or other piece of jewelry to be worn on the outside of the clothing and exposed to light, and solar cells on the external surface of the aid are exposed to the ambient light.

The above and many other objects, features, and advantages of this invention will be more fully understood from the ensuing detailed description of a preferred embodiment, which is to be considered in connection with the accompanying drawing.

Figure 1:
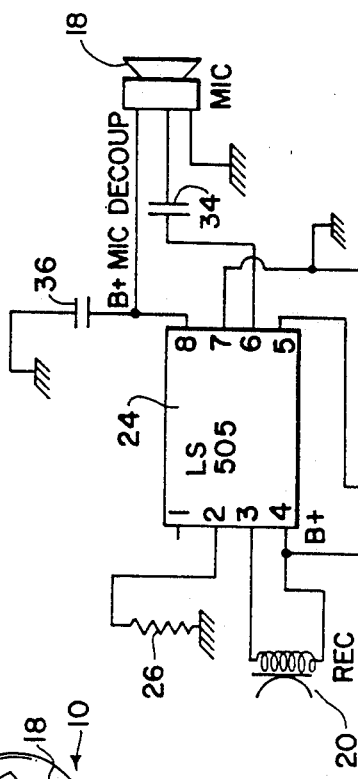
FIG. 1 is a perspective view of an in-the-ear hearing aid according to one embodiment of this invention.

With reference to the drawing, and initially to FIG. 1 thereof, an in-the-ear (ITE) hearing aid 10 that embodies the invention is shown to have a shell 12 molded to fit the ear of an individual wearer. This shell has a projection 12a which fits into the auditory canal of the wearer. The aid 10 also has a back plate 14 affixed on the outward side of the shell 12. The plate 14 carries a volume control knob 16, which is turned to raise or lower the volume, and also controls an on/off switch. This knob 16 is shown as an example, and another arrangement, such as a digital touch-switch volume control, could be substituted.

A microphone or pick-up 18 is disposed at an opening in the back plate 14, and a receiver 20 or audio output transducer is disposed at a hole in the end of the shell projection 12a.

A solar cell 22, which here is a wafer of amorphous silicon, is disposed on the backplate 14 and has a photosensitive surface at least partly exposed externally on the plate 14 so that the photocell 22 will produce electrical current when illuminated in ambient light.

Figure 2:
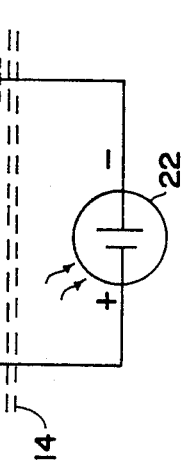
FIG. 2 is a circuit diagram of the preferred embodiment.

As shown in the circuit diagram of FIG. 2, the aid 10 has a hearing aid integrated power amplifier 24, which in this case is a type LS 505 CMOS module, with pin terminals numbered 1 through 8. Pin number 1 is a peak clipping, terminal, and is optionally connected to a voltage reference where the total signal amplitude must be limited. Pin 2 is connected to ground through a resistor 26. Pins 3 and 4 are coupled across input of the receiver 20, and pin 4 is also employed as a power input terminal to receive battery voltage B+.

An on/off switch 28 is connected to Pin 4 of the amplifier 24, and this switch 28 is coupled to the slider of a variable resistor 30 which serves as the volume control element 16. The resistive element of the volume control variable resistor 30 is connected on one side to pin 5 of the amplifier 24, and on the other side, through a series capacitor 32, to ground. Pin 6 of the amplifier 24 is coupled through a capacitor 34 to an audio output of the microphone 18. Pin 7 serves as a grounding pin. Pin 8 provides a decoupled mic battery B+ to a decoupled power input of the microphone 18, and for this reason, an integrating capacitor 36, here for example, of a capacitance of ten microfarads, is coupled between pin 8 and ground. A rechargeable nickel-cadmium (Nicad) storage cell 40 has its negative terminal connected to Pin 7, i.e. to ground, and has its positive terminal coupled, through the on/off switch 28, to Pin 4 to supply the voltage B+ thereto. This rechargeable storage cell 40 is permanently connected, and, as is illustrated, is entirely inside the shell 12, that is, entirely behind the back plate 14.

As is further illustrated, the solar cell 22 has its positive and negative terminals coupled to the light terminals of the Nicad rechargeable storage cell 40, but the solar cell 22 is disposed externally of the back plate 14. As indicated in ghost lines, an optional protective diode 42 can be included in circuit between the Nicad cell 40 and the solar cell 22.

The solar cell 22 has a nominal full-sun capacity of two milliamps, and, under worst-light conditions, will produce a current on the order of 200 to 280 microamps. The amplifier 24 has a low current draw, generally on the same order of 200 to 280 microamps, and the amplifier 24 can be built to match the power of the solar cell 22. The rechargeable Nicad storage cell 40 has a nominal storage capacity of 20–30 milliamp hours (mah), although for most wearers a storage cell of 10 mah will suffice.

Under normal ambient light conditions, the solar cell 22 will recharge the storage cell 40. If recharging is required at night, the wearer can simply remove the hearing aid 20 from his or her ear, and place it under a lamp or otherwise expose the solar cell 22 to artificial light, and the hearing aid storage cell 40 will recharge overnight.

Instead of the amorphous silicon solar cell 22, a Galium Arsenide (GaAs) cell can be employed. These cells are somewhat more expensive, but there is a considerable advantage in power output.

The solar cell rechargeable battery hearing aid 10 of this invention would obviate the aforementioned problem many wearers experience, namely, forgetting to purchase batteries, forgetting to recharge, or inability to recharge when away from home, or inability to manipulate a new battery to fit into the aid. Instead, the "recharger" solar cell 22 is built into the device, and the rechargeable storage cell 40 is a permanent part of the device. No charger is to be connected, as the hearing aid 10 recharges on light alone. These devices are sturdy enough to be provided with a warranty period of two years or more, and preferably the devices are factory serviceable, not serviceable by a customer or dealer.

In the particular embodiment depicted in FIG. 1, the cell 22 is a small amorphous silicon cell, having a length of 11.7 millimeters, a width of 6.7 millimeters, and a thickness of 1.1 millimeters. The minimum characteristics at one-tenth of full sun are 0.9 volts and 200 microamps. The small built-in storage cell 40 is favorably a Nicad cell having a capacity of 10 to 30 mah at 1.2 volts. The case dimensions of the cell 40 are 8–12 millimeters by about 5 millimeters.

The charging and discharging characteristics of the cells 22 and 40 of the above-described embodiment of the hearing aid 10 are set forth in the attached table, both for a rather large current drain (Id=0.680 ma) and for a normal current drain (Id=0.280 ma). Under darkest conditions, and under maximum drain, a hearing aid will continue to operate for over 10 hours. In the case of 0.680 ma drain, the solar cell 22 will power the hearing aid and will actually charge the storage cell 40 for ambient light conditions of about 40 percent or more full sun. In the case of the normal drain of 0.280 ma, the solar cell will power the hearing aid and will recharge the storage cell 40 for ambient conditions beginning at about 20 percent full sun.

As aforementioned, this invention is not limited to the ITE hearing aid shown in FIG. 1, but can be employed favorably in any type of hearing aid. For example, in a behind-the-ear aid, an array of solar cells 22 can be employed to provide an increased current output. This enables the hearing aid to have additional gain to combat excessive hearing losses.

Figure 3:
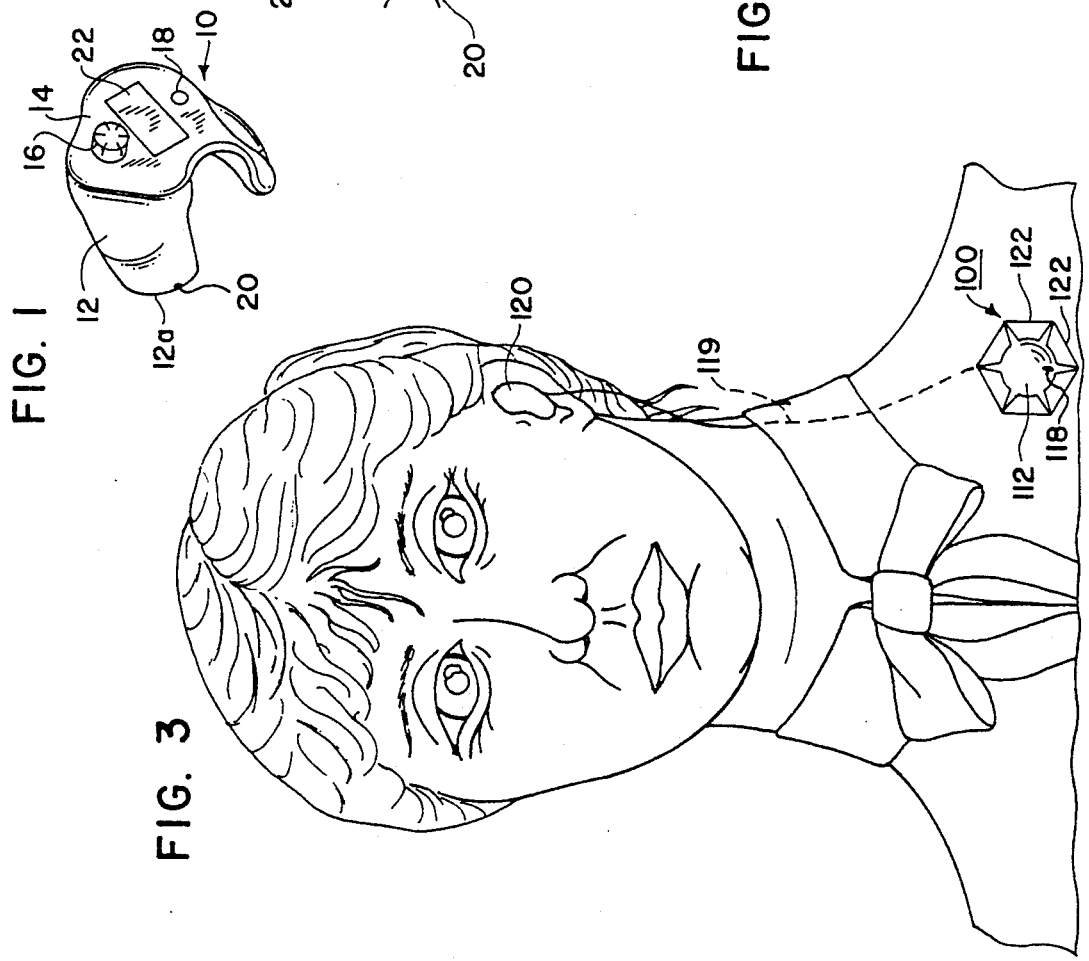
FIG. 3 shows a broach-type body hearing aid according to another embodiment of this invention.

One useful variation of this invention is shown in FIG. 3, which depicts a body-type hearing aid 100 having the case 112 thereof formed as a broach or pendant, which is actually worn as jewelry. In this instance, the case 112 can have an artistic, aesthetically pleasing design. A microphone or pick-up 118 is disposed behind a small hole in front of the case 112, and an earphone cable 119, concealed in the wearer's clothing, extends to an earpiece 120. The solar cells 122 are incorporated as part of the overall jewelry design on the front or outward facing side of the case 112. This arrangement allows a significant increase in area of photocell exposure, to provide a significant power increase for the severely hearing impaired. A Nicad storage cell (not shown), of increased size to correspond to the capacity of the solar cells 122, would also be disposed within the case 112.

While the invention has been described with reference to certain embodiments, it should be understood that the invention is not limited to those embodiments, and that many modifications and variations thereof would present themselves to those skilled in the art without departure from the scope and spirit of this invention, as defined in the appended claims.

We claim:

1. In an in-the-ear hearing aid of the type in which a case is shaped to fit in a wearer's outer ear, the case having a canal portion extending into the auditory canal of the wearer, and a back plate facing outward, comprising pickup transducer means in the case for converting ambient sounds to an electrical signal, electrical amplifier means within the case for amplifying said electrical signal, acoustical output transducer means in the canal portion of the case coupled to an output of the amplifier means for delivering amplified sound into the auditory canal of the wearer, and power cell means within the case for providing electrical power to said amplifier means; the improvement wherein said power cell means include a rechargeable storage cell permanently situated within the case below the back plate, and a photo cell carried on said back plate and having at least a photosensitive surface exposed, the photocell being connected in parallel with said storage cell and being of sufficient power capacity to power the amplifier means and at the same time to recharge the storage cell under average ambient sunlight conditions, the storage cell having a nominal capacity of between 10 and 30 milliampere hours to power the amplifier means for at least several hours under darkness conditions.

2. A hearing aid as in claim 1 wherein said storage cell is a nickel-cadmium cell.

3. A hearing aid as in claim 1 wherein said photocell includes a thin-film amorphous silicon solar cell.

4. A hearing aid as in claim 1 wherein said solar cell has a full-sun current capacity at least on the order of 2 milliamperes and a current capacity at 1/10 average sunlight intensity on the order of 200 microamperes, so that the solar cell contributes a substantial portion of the current for said amplifier means while the hearing aid is being worn in ambient light conditions.

5. A hearing aid as in claim 1 further comprising a protective diode disposed between like-polarity terminals of said photocell and said storage cell.

6. A hearing aid as in claim 1 wherein like-polarity terminals of said photocell and said storage cell are connected directly without a protective diode therebetween.

7. A body-aid type of hearing aid comprising a case that is worn as jewelry on the chest of a wearer, and having an outward facing surface and means for carrying the case on the outside of the wearer's clothing and exposed to light, pickup transducer means in the case for converting ambient sounds to an electrical signal, acoustic output transducer means worn in the wearer's ear and remote from the case, but coupled to an output of the amplifier means for delivering amplified sound into the auditory canal of the wearer, a rechargeable storage power cell within the case for providing electrical power to said amplifier means and permanently situated within the case, and at least one photocell carried on the outward facing surface of said case having at least a photosensitive surface exposed, the photocell being connected in parallel with said storage cell and being of sufficient power capacity to power the amplifier means and at the same time recharge the storage cell under average ambient sunlight conditions, the storage cell being of sufficient capacity to power the amplifier means for at least several hours under darkness conditions.

8. A hearing aid as in claim 1 wherein said photocell is a GaAs solar cell.

9. A method of employing a hearing aid of the in-the-ear type in which a case is shaped to fit in the wearer's outer ear, the case having a canal portion extending into the auditory canal of the wearer and a back plate facing outwards, comprising pickup transducer means in the case for converting ambient sounds to an electrical signal, electrical amplifier means within the case for amplifying said electrical signal, acoustic output transducer means in the canal portion of the case coupled to an output of the amplifier means for delivering amplified sound into the auditory canal of the wearer, a power cell within the case in the form of a rechargeable storage cell permanently situated within the case for providing electrical power to said amplifier means, and having a nominal capacity of between about 10 and 30 milliampere hours to power the amplifier means for at least several hours under darkness conditions, and a photocell carried on said back plate and having at least a photosensitive surface exposed, the photocell being connected in parallel with the storage cell and being of sufficient power capacity to power the amplifier means and recharge the storage cell under average ambient sunlight conditions; the method comprising the steps of:

wearing the aid in the ear when assistance in hearing is desired, including exposing said power cell to light while the aid is being worn to generate at least a portion of the power for said amplifier means; and re-energizing the aid when out of the ear by placing the aid so as to expose said photocell to a source of artificial illumination.

10. The method of claim 9, said re-energizing comprising exposing said aid overnight to said artificial illumination.

* * * * *